D. NOBLE.
CRANK HEMSTITCH EMBROIDERING MACHINE.
APPLICATION FILED NOV. 11, 1907.

1,033,055.

Patented July 16, 1912.

12 SHEETS—SHEET 1.

WITNESSES:
A. K. Williams
A. M. Donihee

INVENTOR
Donald Noble
BY
F. W. Ostrom
ATTORNEY.

D. NOBLE.
CRANK HEMSTITCH EMBROIDERING MACHINE.
APPLICATION FILED NOV. 11, 1907.

1,033,055.

Patented July 16, 1912.
12 SHEETS—SHEET 5.

WITNESSES:
A.K. Williams Jr.
A. M. Dunihee

INVENTOR.
DONALD NOBLE
BY
F. W. Ostrom
ATTORNEY.

D. NOBLE.
CRANK HEMSTITCH EMBROIDERING MACHINE.
APPLICATION FILED NOV. 11, 1907.
1,033,055.
Patented July 16, 1912.
12 SHEETS—SHEET 6.
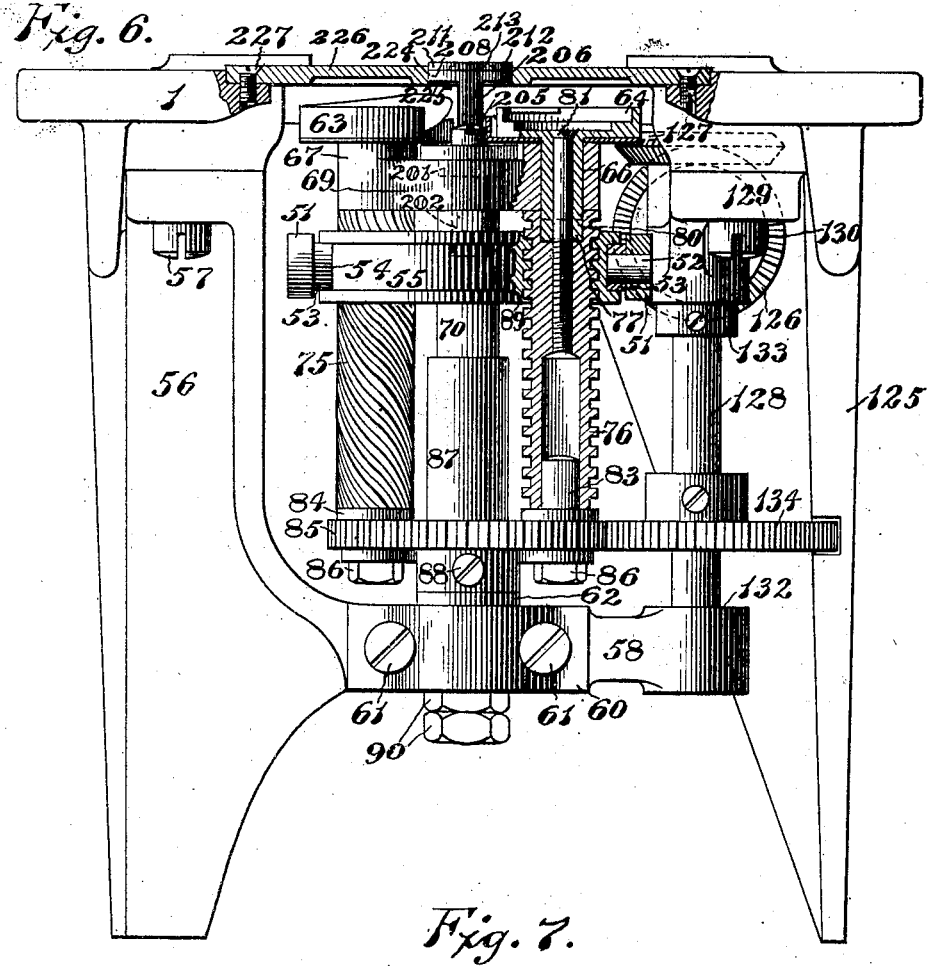
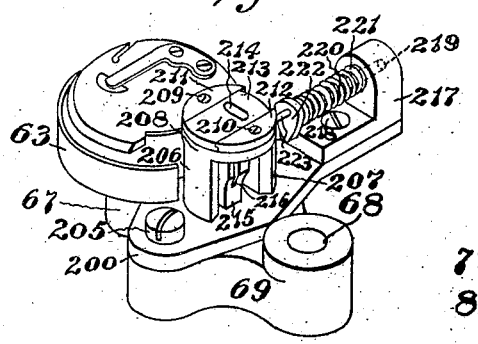
WITNESSES:
A. K. Williams Jr.
A. M. Donihee
INVENTOR.
DONALD NOBLE
BY
F. W. Ashton
ATTORNEY.

D. NOBLE.
CRANK HEMSTITCH EMBROIDERING MACHINE.
APPLICATION FILED NOV. 11, 1907.

Patented July 16, 1912.

WITNESSES:

INVENTOR.
DONALD NOBLE
BY
ATTORNEY.

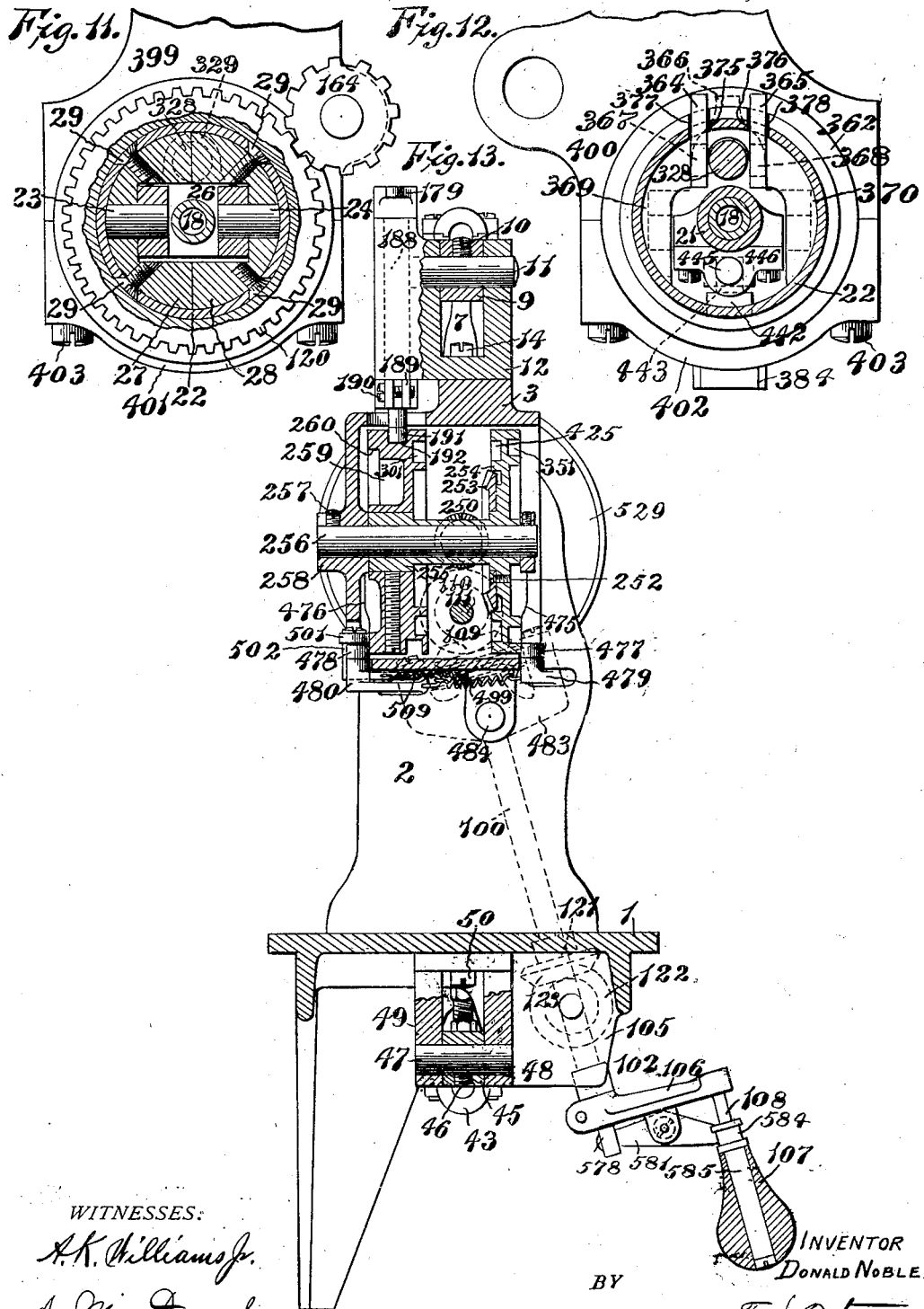

D. NOBLE.
CRANK HEMSTITCH EMBROIDERING MACHINE.
APPLICATION FILED NOV. 11, 1907.

1,033,055.

Patented July 16, 1912.
12 SHEETS—SHEET 9.

INVENTOR.
DONALD NOBLE

WITNESSES:

BY
ATTORNEY.

D. NOBLE.
CRANK HEMSTITCH EMBROIDERING MACHINE.
APPLICATION FILED NOV. 11, 1907.
1,033,055.
Patented July 16, 1912.
12 SHEETS—SHEET 10.
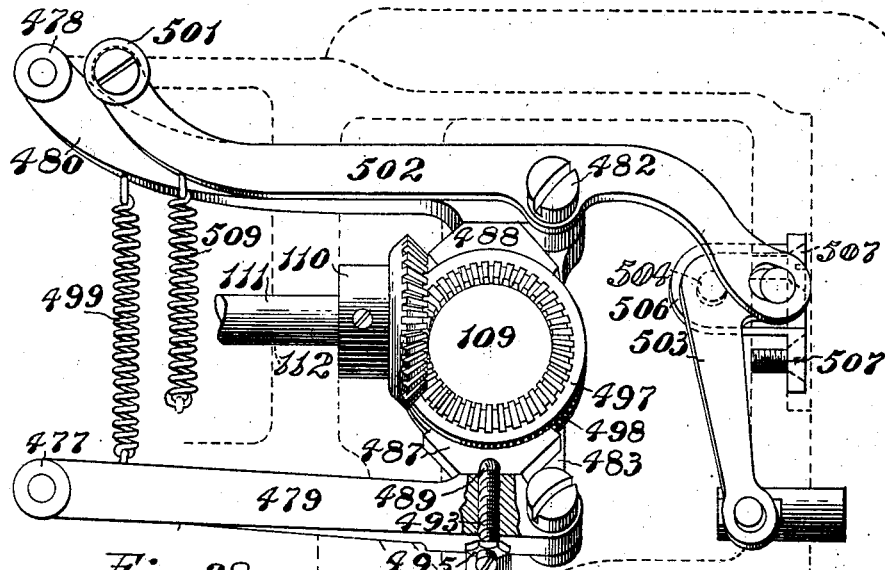
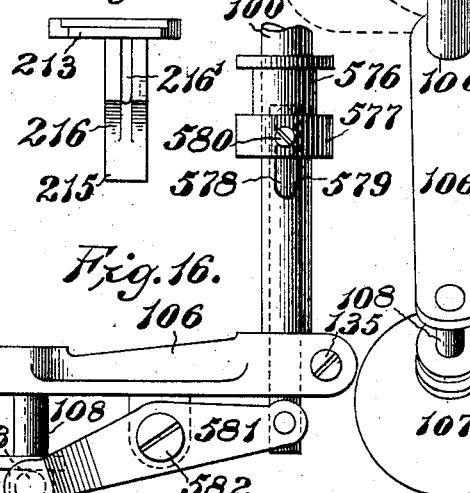
WITNESSES:
A. K. Williams Jr.
A. Doniker.
INVENTOR.
DONALD NOBLE
BY
ATTORNEY.

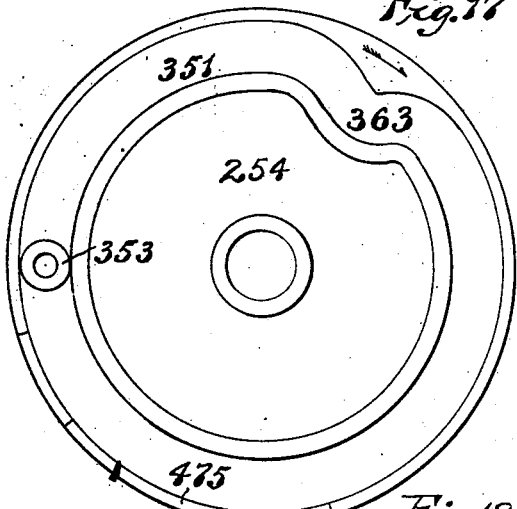
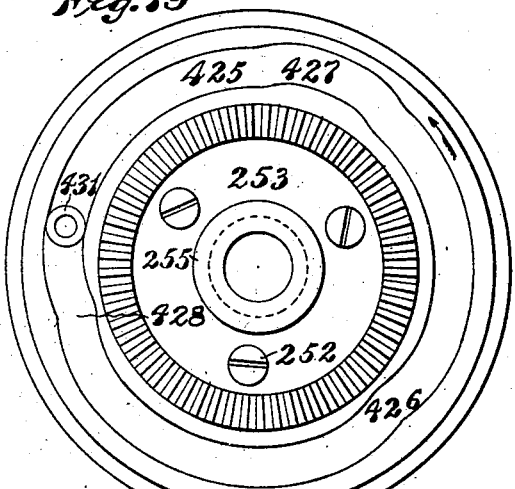
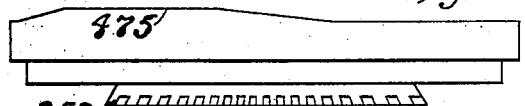
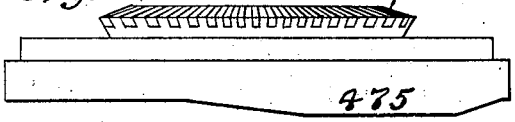
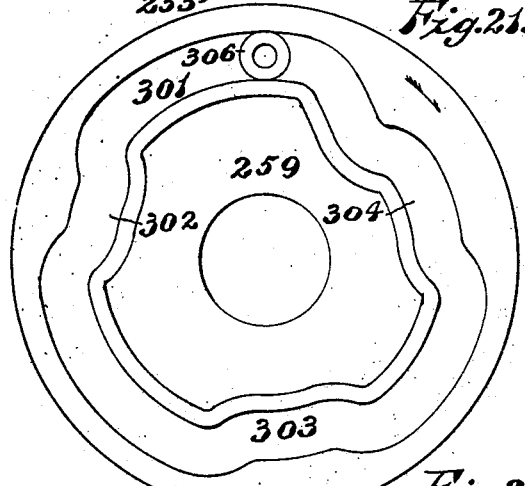
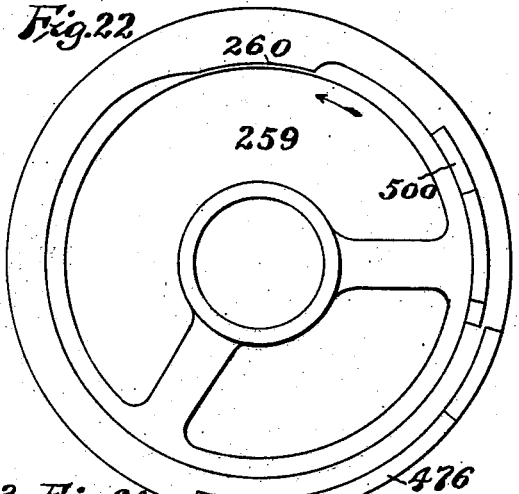
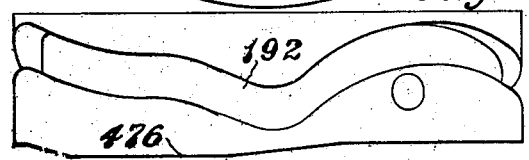
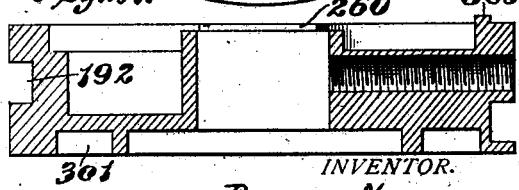

D. NOBLE.
CRANK HEMSTITCH EMBROIDERING MACHINE.
APPLICATION FILED NOV. 11, 1907.
1,033,055.
Patented July 16, 1912.
12 SHEETS—SHEET 12.
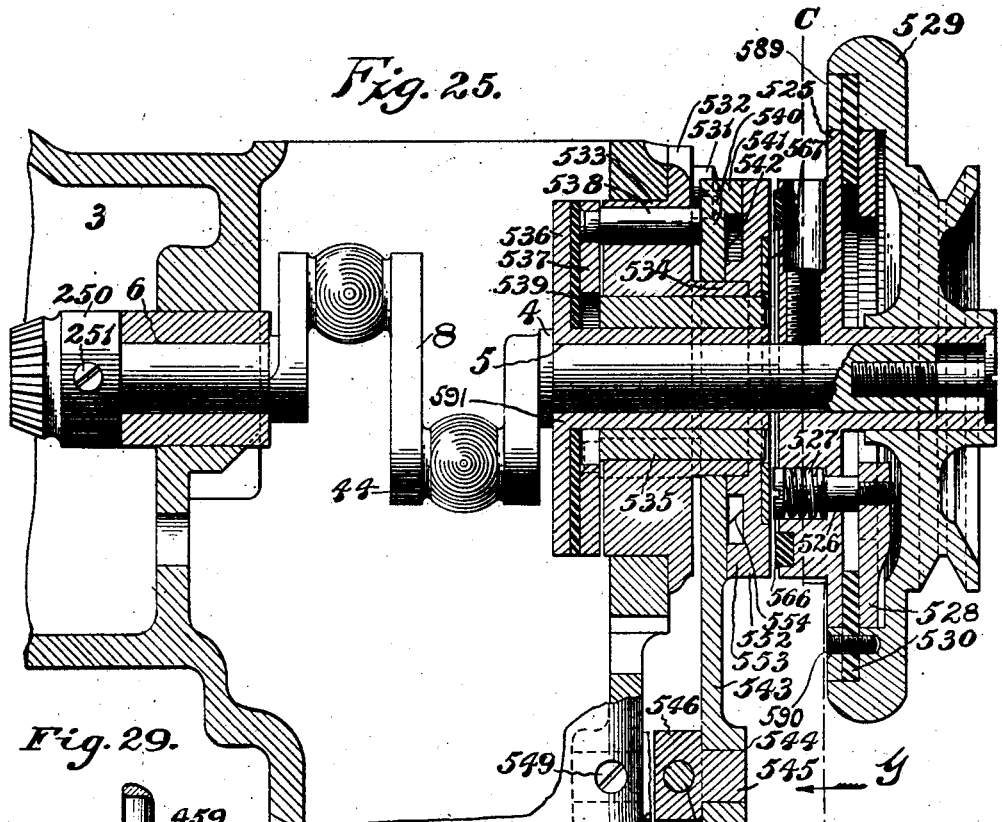
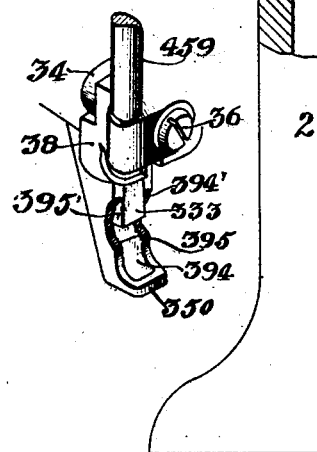
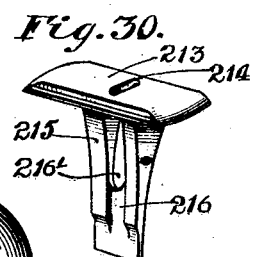
WITNESSES:
A. K. Williams Jr
A. M. Donihee
INVENTOR.
DONALD NOBLE.
BY
F. N. Ashton
ATTORNEY.

UNITED STATES PATENT OFFICE.

DONALD NOBLE, OF BRIDGEPORT, CONNECTICUT, ASSIGNOR TO THE SINGER MANUFACTURING COMPANY, A CORPORATION OF NEW JERSEY.

CRANK HEMSTITCH EMBROIDERING-MACHINE.

1,033,055.   Specification of Letters Patent.   Patented July 16, 1912.

Application filed November 11, 1907. Serial No. 401,644.

*To all whom it may concern:*

Be it known that I, DONALD NOBLE, a subject of the King of Great Britain, and a resident of Bridgeport, in the county of Fairfield and State of Connecticut, have invented certain new and useful Improvements in Crank Hemstitch Embroidering-Machines, of which the following is a specification.
This invention has for its object to improve that class of sewing machines commercially termed "crank hemstitch embroidering machines," wherein the material is fed in any desired direction by means of a feeding mechanism operatively connected with a manually controlled crank mounted so as to be conveniently manipulated.

Figure 1:
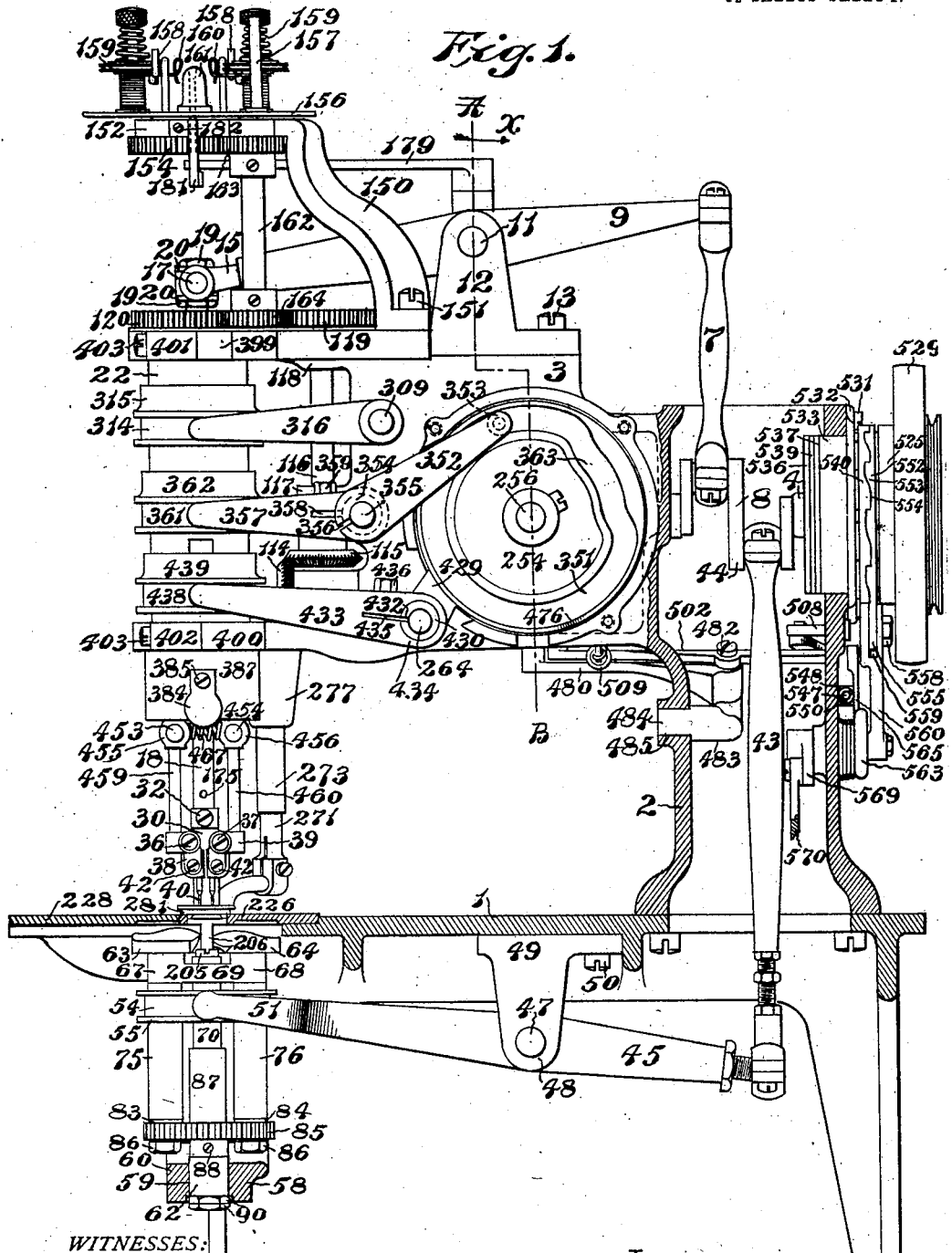
Figure 2:
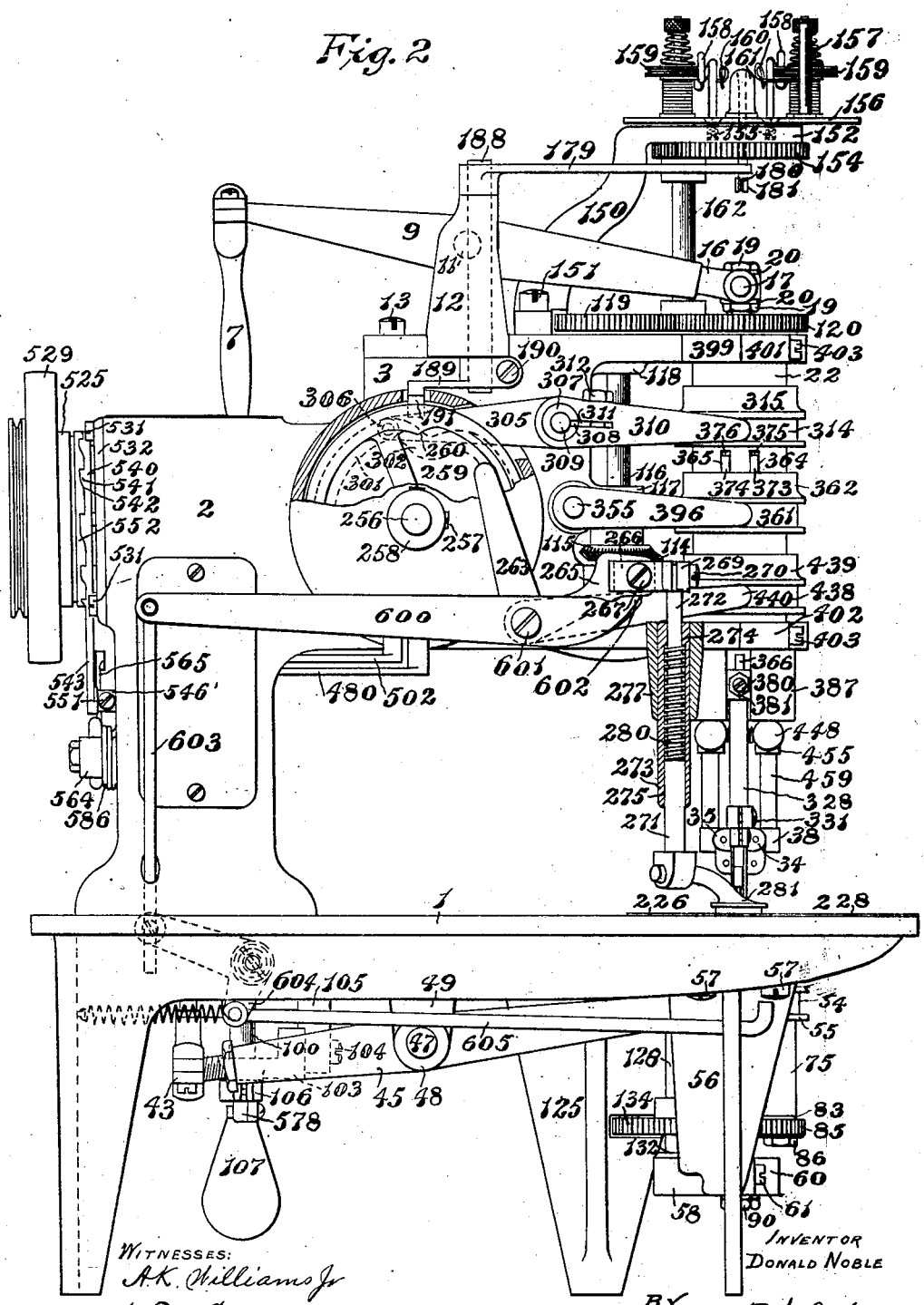
Figure 3:
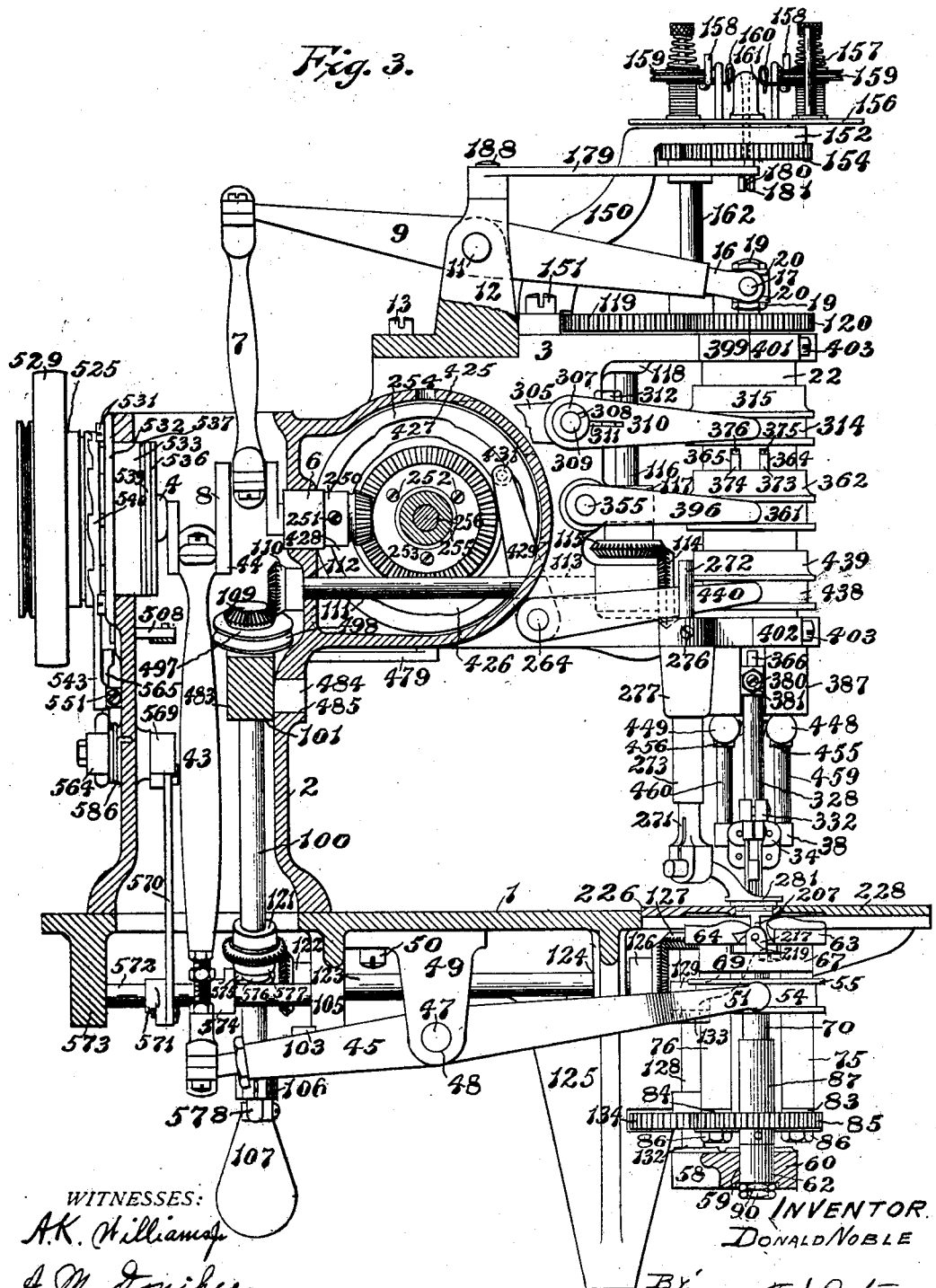
Figure 4:
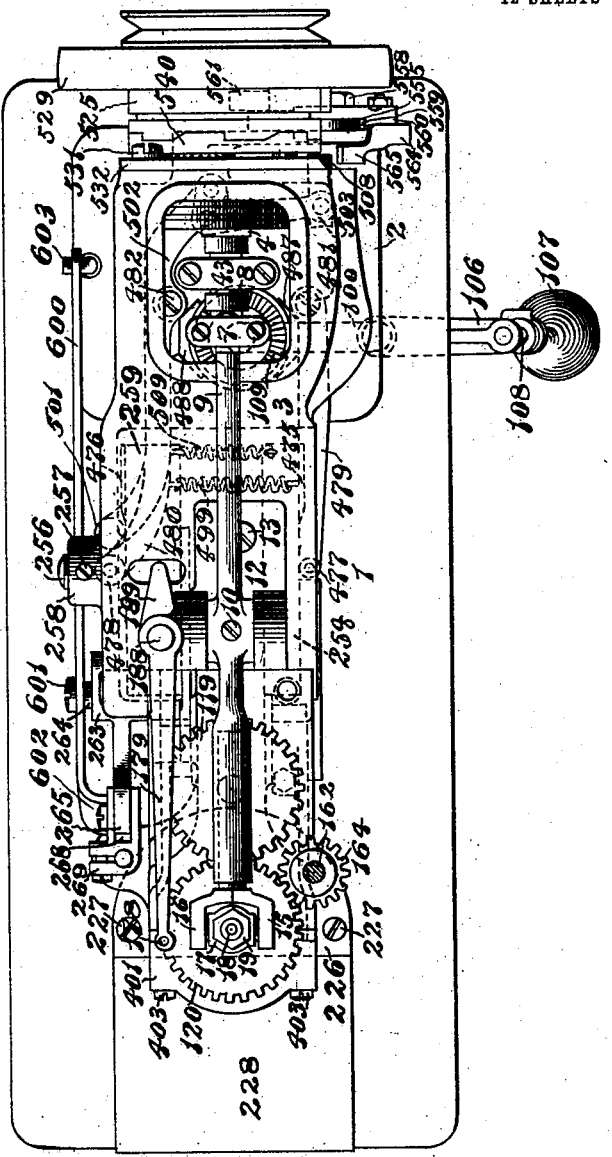
Figure 5:
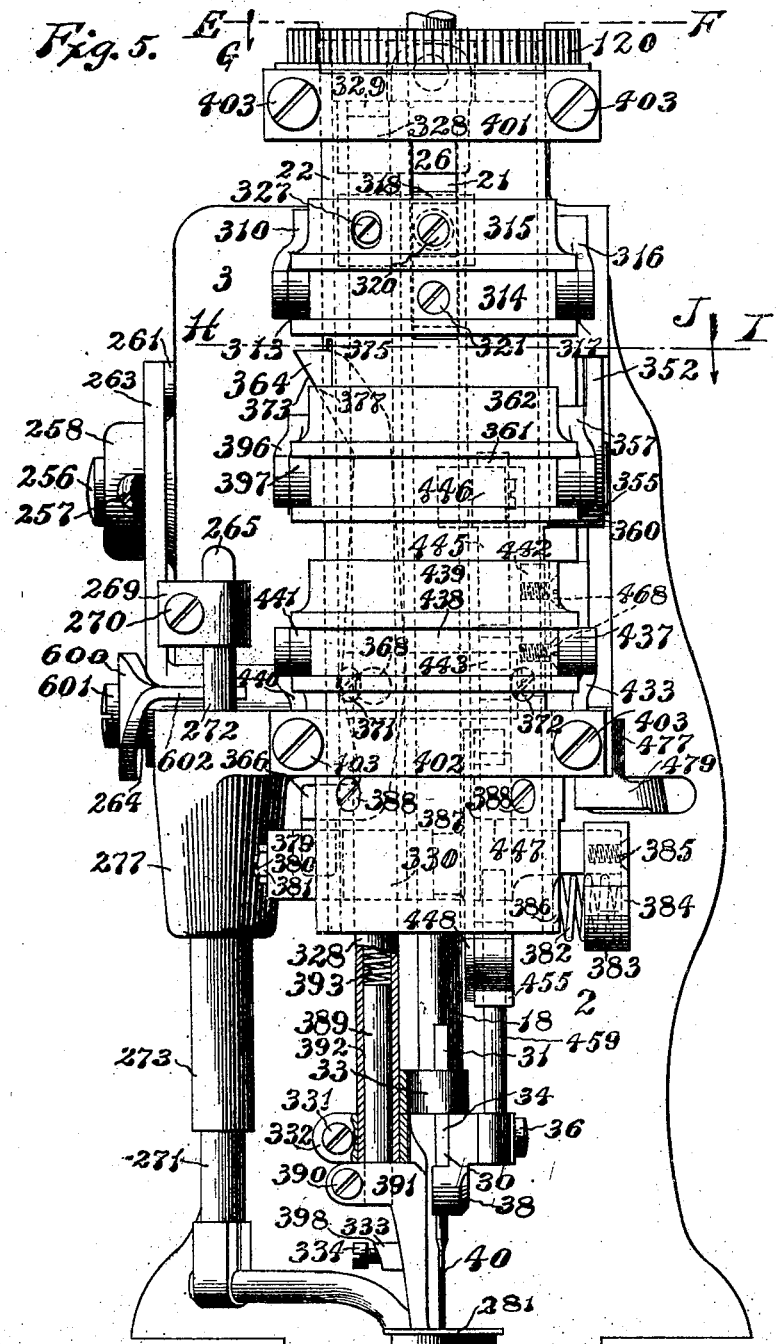
Figure 9:
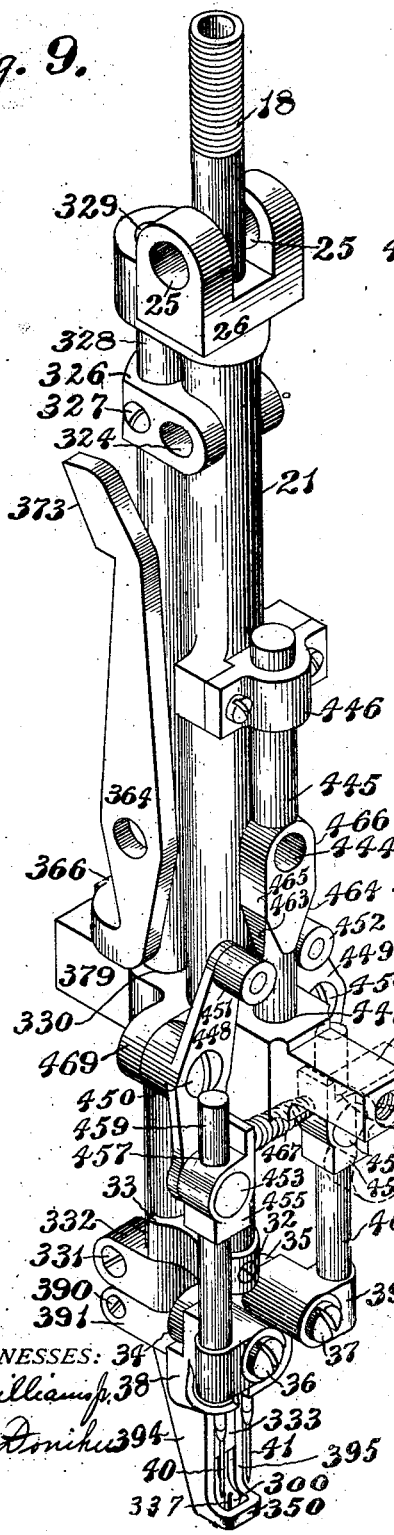
Figure 10:
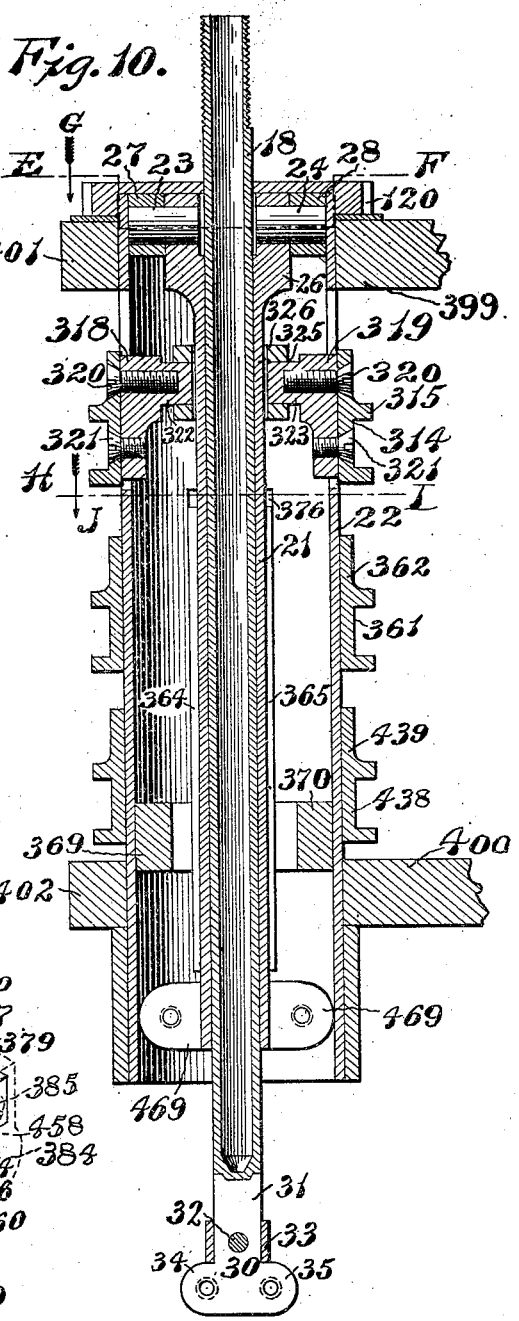
Figure 14:
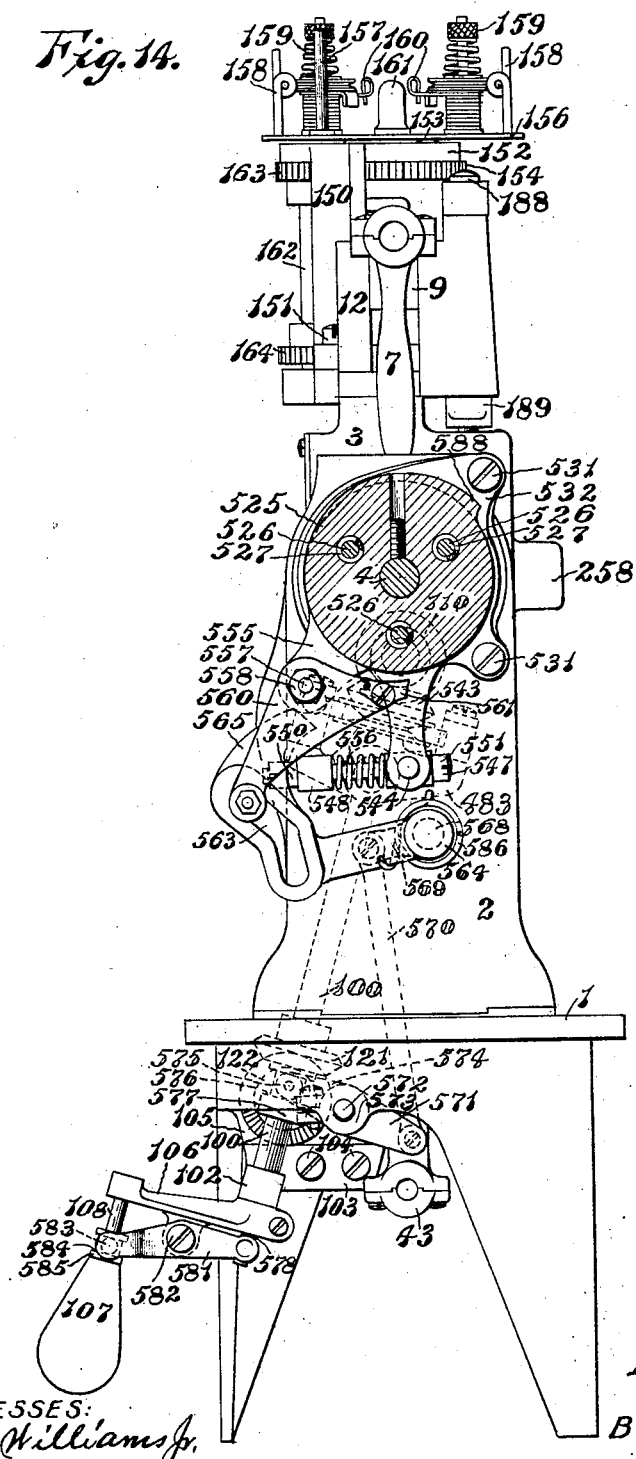

Referring to the accompanying drawings, in the several figures of which like parts are similarly designated, Figure 1 is a view in front side elevation of an embroidering machine embodying my improved mechanism, the bed-plate and arm standard being shown in section. Fig. 2 is a rear side elevation, partially broken away to better illustrate the means employed for actuating the needle-thread take-up. Fig. 3 is a rear side elevation similar to Fig. 2, partially in section to better illustrate the mechanism for controlling the feed of the material. Fig. 4 is a plan view of Fig. 1, the spool-holding bracket and parts attached thereto being removed. Fig. 5 is a front end elevation of the overhanging arm, the spool-holding bracket and parts attached thereto being removed as in Fig. 4. Fig. 6 is a front end elevation of the sewing machine bed-plate and the parts carried thereby, the latter being shown partially in section.
Fig. 7 is a view in perspective of the throat-plate, one of the two loopers, and the frame upon which said throat-plate is mounted. Fig. 8 is a detail sectional view, in perspective, illustrating the means employed for connecting the hub of the loop-taker with its driving shaft. Fig. 9 is a view in perspective of the mechanism located in and extending below the feed-controlling cylinder. Fig. 10 is a vertical central section of the cylinder and parts carried by it. Fig. 11 is a horizontal section substantially on the line E—F of Figs. 5 and 10, looking in the direction indicated by the arrow G. Fig. 12 is a horizontal section substantially on the line H—I of Figs. 5 and 10, looking in the direction indicated by the arrow J. Fig. 13 is a view in section on the line A—B, Fig. 1, looking in the direction indicated by the arrow X. Fig. 14 is a rear end elevation of Fig. 2, the crank-shaft and stop motion mechanism being shown in section on the line C—D Fig. 25. Fig. 15 is an enlarged detail view of the clutch mechanism for controlling the time of movement of the rotating cylinder, the machine frame being shown in dotted lines. Fig. 16 is a detail view of the mechanism comprising the hand crank. Figs. 17, 18, 19 and 20 are views of the oppositely arranged cam sections and grooves of the cam disk located at the front side of the overhanging arm. Figs. 21, 22, 23 and 24 are views illustrating the cam grooves and sections formed in and upon the cam disk located at the rear side of the overhanging arm. Fig. 25 is a central vertical section of the stop-motion mechanism and the arm standard. Figs. 26 and 27 are enlarged diagrammatic views of the stitch formation and open-work seam, respectively. In the former figure the point of intersection of the sewing threads designates the point at which the needle enters the material in the formation of the stitches, the latter figure representing the finished seam. Fig. 28 is a detail view of the throat slide plate provided with the needle-guard-and-loop-controller. Fig. 29 is a view in perspective of the lower portion of Fig. 9, the step foot being broken out to better illustrate the means employed for guiding the piercer holder. Fig. 30 is an enlarged view, in perspective, of the throat slide-plate.

1 is the bed-plate of the sewing machine, upon which is mounted the bracket-arm constructed with the standard 2 and laterally extending member 3, and 4 the crank shaft journaled in bearings 5 and 6 secured in the arm standard 2.

7 is the needle-bar crank connection, connected at one with a crank 8 and at its opposite end operatively connected with the needle-bar-actuating lever 9, said lever being secured by a screw 10 to a fulcrum pin 11 journaled in suitable bearings formed in the bracket 12, which latter is secured to the overhanging arm by suitable screws 13 and 14. The needle-bar lever 9 is made tubular at its forward end and provided with a yoke connection consisting of the two parts 15 and 16, and into said yoke is journaled a rocking connection 17 which is operatively connected, by nuts 19, 19 and washers 20, 20, with the upper end of the needle-bar 18.

As indicated in Figs. 1, 2, 3 and 4, the stem of the yoke member 15 16 is mounted for oscillation in the socketed forwardly extending arm of the lever 9, while the parts 15 and 16 are spaced sufficiently to allow a slight lateral movement of the block 17 upon its alined fulcrum-pins, so as to compensate for the sidewise movement of the needle-bar.

The needle-bar 18 is mounted to move vertically in suitable bearings formed in the swinging frame 21, which latter is pivoted at its upper end, by suitable lugs, as 23 and 24, entering the respective holes 25, 25 formed in the bracket 26, to the inner upper end of the rotating cylinder 22 serving as a carrier for the needle-frame 21 and certain other parts supported thereby which will be later referred to. The bracket 26 forms a part of the swinging frame 21, and the lugs 23 and 24 form a part of the complemental brackets 27 and 28, respectively, secured, by screws 29, to the cylinder 22.

To the lower end of the needle-bar 18 is secured a plate 30 of inverted T-shape, the longer arm 31 of which is secured by a screw 32 in a slot formed in the lower end of said needle-bar, the screw 32 also acting to secure the bracket collar 33 upon said bar. To the arms 34 and 35 of the plate 30 are secured, by pivot screws 36 and 37, the needle-carrying levers or needle clamps 38 and 39 into which the needles 40 and 41, respectively, are secured by the usual needle set screw 42.

43 is the looper-actuating crank connection, operatively connected at one end with the crank 44, its lower or opposite end being connected with the looper-actuating lever 45 secured by screw 46 upon the fulcrum pin 47, which, in turn is mounted to oscillate in bearings 48 formed in the bracket 49, which latter is secured by screws 50 to the underside of the bed-plate. The forward end of the lever 45 is provided with complemental arms 51, which carry complemental studs 52 provided with complemental rollers 53 (one only of which is shown), said studs and rollers entering a groove 54 formed in the loop-taker-driving ring 55.

56 is the frame bracket which is secured by screws 57, 57 to the lower side of the bed-plate and provided with an arm 58 which, in turn, is provided with a pinch bearing 59, comprising an integral part of the arm 58, and with a cap 60, said cap being secured by screw 61, 61 to said arm.

62 is an adjustable bushing secured by the cap 60 in the pinch bearing 59.

63 and 64 are loop-takers, each of which is provided with a hub 66 (one only of which is shown) mounted in the respective bearings 67 and 68 formed in the head 69 of the standard 70, said hubs being provided with downwardly extended portions 77 (shown only in connection with hub 66) which enter complemental notches 80 (shown only in connection with shaft 76) formed in the loop-taker-driving shafts 75 and 76, said extended portions and notches acting to synchronize the movements of said shafts and loop-takers. The loop-takers 63 and 64 are held against vertical movement, relatively to the driving shafts 75 and 76, by screws 81 (one only of which is shown). The lower ends of the driving shafts 75 and 76 are mounted upon adjustably secured bearings 83 and 84, respectively, which latter are threaded into the gear 85 and secured against accidental movement by the nuts 86, 86, the gear 85 being provided with an elongated hub 87 which is secured by a screw 88 upon the standard 70. The standard 70 is held in vertical adjustment, relatively to the bushing 62, by nuts 90, 90. The driving ring 55 is provided with complemental threaded openings 89 (one only of which is shown) corresponding to the threads formed on the shafts 75 and 76, and as said ring is moved vertically in opposite directions, the loop-takers are caused to oscillate and coact with the needles to form stitches.

From the foregoing it will be understood that the rotation of the crank 8, through the connections previously pointed out, transmits vertical movements to the needle, and that the crank 44, through the connections pointed out, transmits oscillatory movements to the loop-takers.

100 is a hand crank shaft, the upper end of which is mounted in a bearing 101 formed in a bracket later to be described, its lower end being mounted in a bearing 102 formed in a bracket 103 secured, by screws 104, 104, to a lug 105 forming a part of the bed-plate 1. To the lower end of the crank shaft 100 is secured a hand crank consisting of a lever 106 and handle 107, said handle being provided with a bushing, later to be referred to, loosely mounted upon the rod 108 secured in the lever 106. Upon the upper end of said crank shaft is secured a bevel gear 109 which meshes with a like gear 110 secured upon a horizontal shaft 111, said shaft being mounted in bearings 112 and 113 formed in the arm standard and overhanging arm, respectively. The shaft 111 has secured to its forward end a second gear 114 which meshes with a like gear 115 carried by an upright shaft 116 which, in turn, is mounted in bearings 117 and 118 formed in the overhanging arm. To the upper end of the shaft 116 is secured a gear 119 which meshes with a like gear 120 secured upon the rotating cylinder 22.

Near the lower end of the hand crank shaft 100 is secured a bevel gear 121 which meshes with a like bevel gear 122 mounted on a second horizontal shaft 123, which latter is mounted at one end in a bearing formed in a lug 105, its opposite end being mounted in a bearing 124 formed in the rib portion of the support 125 extending down from the bed-plate.

To the forward end of the shaft 123 is secured a gear 126 which coacts with a like gear 127 carried by the upright shaft 128, the upper end of said shaft being mounted in bearings formed in a bracket 129 secured by screws 130 to the underside of the bed-plate, the lower end of said shaft being mounted in the bearing 132 formed in the end of the arm 58 of the frame bracket 56, a collar 133, in connection with the gear 127, acting to hold the shaft 128 against endwise movement. Upon the upright shaft 128 is secured a gear wheel 134 which meshes with the gear wheel 85 carried by the standard 70, thus completing the train of mechanism between the crank handle 107 and the loop-takers 63 and 64, and said crank handle and the cylinder 22, for rotating said loop-takers and cylinder, and parts carried by said cylinder, synchronously and about a common axis.

That the needle threads may follow the rotation of the needles, loop-takers, feeding mechanism and bobbin threads, I mount upon the overhanging arm a bracket 150 secured by screws 151, 151. The upper end of the bracket 150 comprises a circular portion 152 into which is journaled the hub 153 of the gear 154, which hub extends slightly above the upper surface of said circular portion. To the upper side of the hub 153 is secured, by screws as 155 (shown in dotted lines only), a disk 156 carrying the complemental spooler pins 157, thread eyes 158, thread tensions 159, thread-controlling springs 160 and the central thread guide 161.

162 is an upright shaft carrying near its opposite ends the gears 163 and 164, said shaft being journaled at its upper end in the bracket 150 and at its lower end in the overhanging arm, the gear 163 meshing with the gear 154, and the gear 164 meshing with the gear 120, thus transmitting to the gear 154 and parts carried by it rotary movements corresponding to the movements of the cylinder 22.

The usual needle threads are passed from the supply through the thread eyes 158, thread tensions 159, thread controller springs 160 and thread guide 161, then through the eye 178 in the take-up lever 179 and through an eye 180 formed in the bracket 181, which latter is secured by screw 182 to the bracket 150, followed by passing said threads down through the hollow needle-bar 18 and out through the thread opening 175 to the thread eyes of the respective needles 40 and 41. The loop-takers are provided with the usual bobbins and thread, which latter concatenates with the needle thread to form stitches in the usual manner.

The take-up lever 179 is secured to the upper end of a vertically arranged rock-shaft 188 which is journaled in a suitable bearing formed in the bracket 12, a lever 189 being secured, by pinch screw 190, to the lower end of said rock-shaft. The lever 189 carries at its free end a roller 191 which tracks within a cam groove 192 formed in the outer edge of a cam later to be described.

200 is the throat-plate frame base provided at its underside with a boss 201 and pin 202 (shown in dotted lines, Fig. 6) which enter suitable openings formed in the head 69 of the standard 70, said base being held against accidental movement by a screw 205 passing through said base and threaded into the head 69. The base 200 is constructed with two upright posts 206 and 207 which support the throat-plate 208. To the upper surface of the throat-plate is secured, by screws 209 and 210, two undercut guide plates 211 and 212, respectively, between which is mounted the throat slide plate 213 having a needle opening 214. From the underside of the plate 213 there is extended downwardly a needle-guard-and-loop-controller 215 which, at its lower end, is provided with oppositely arranged grooves 216 (one only of which is shown) in which the oppositely arranged needles travel in their vertical movements to form stitches, said needle-guard-and-loop-controller being provided with an opening 216' for about half its length from the needle opening down to allow the piercer, later to be described, to descend into the material.

217 is a bracket secured by screw 218 to the throat-plate frame base 200, said bracket being provided with an opening 219 through which freely passes a rod 220 carrying a spring 221 confined between the bracket 217 and a plate 222. The plate 222 is secured to the end of the rod 220 and provided with a pin 223 which passes through the post 207 and abuts against the rear side of the needle-guard-and-loop-controller 215, thus effecting a construction of throat-plate wherein the throat slide plate 213 is capable of movements in opposite directions in line with the feed of the material. The throat slide plate is held in its normal position by the circular portion 224 contacting with the inner wall 225 of the cloth-plate 226, which latter is secured to the bed-plate 1 by screws 227.

228 is the front slide plate.

The individual open-work stitches of the production of the device of the application consist of two superposed lock stitches placed in the openings in the material alternating with complemental lock stitches placed back from said openings. Accordingly, there is one feed movement of the material for each open-work stitch or every three lock stitches; and at the time of such feed movement it is essential that the cloth-presser be held out of contact with the material, which feature in construction I will now describe.

250 is a bevel gear secured by screw 251 upon the inner end of the crank shaft 4, said gear meshing with a bevel gear 253 secured by screws 252 to the inner face of a cam disk 254, which latter has formed integral with it a hollow cam shaft 255 mounted to turn on a rod 256 secured by screws 257 in a bearing 258 formed at the rear side of the overhanging arm. The gears 250 and 253 are of the ratio of three-to-one, thus effecting three complete actuations of the stitch-forming mechanism to one rotation of the gear 253.

259 is a second cam disk carried by the hollow shaft 255 and provided at its outer side with a cam portion 260 which coacts with a roller 261 carried by an oscillating bell-crank lever 263, which latter is mounted upon a shaft 264 journaled in suitable bearings formed in the overhanging arm. One end of the lever 263 is provided with a forked projection 265 which embraces a slide block 266 (shown in dotted lines, Fig. 2) pivoted upon a stud screw 267 secured in a bracket collar 269, said slide block being mounted in a slot 268 formed in said bracket collar, which latter is secured by a pinch screw 270 to the upper end of the cloth-presser-carrying bar 271. The upper portion 272 of the bar 271 is reduced in diameter and mounted to move vertically in a depending shaft 273 provided with bearings 274 and 275 which correspond substantially to the two diameters of the bar 271, the shaft 273 being secured by a screw 276 in a hanger 277 projecting downwardly from the overhanging arm. Interposed between the shoulder formed on the bar 271 and the shoulder formed in the shaft 273 is a spring 280 which normally acts to hold the cloth-presser 281 down upon the material.

From the foregoing it will be understood that the cam portion 260, through the connections pointed out, lifts the cloth-presser 281 in opposition to the resiliency of the spring 280 once during the formation of three lock stitches, or at the completion of each embroidery stitch. As the cam-disk 259 is fixed upon the tubular hub 255 of the cam-disk 254, and thus rotates therewith, it will be seen that they together constitute a cam-member from which are derived all the three-cycle movements of the various parts of the mechanism for producing the hem-stitch seam.

300 is the piercer which is operated, by connections now to be described, from the cam groove 301 formed at the inner side of the cam disk 259. The piercer is given one actuation for each complete actuation of the needle-carrying bar, the movements of said piercer occurring during the time that the needles are out of the material; and to effect this the cam groove 301 is provided with three cam portions 302, 303 and 304, the two former acting to control the movements of the piercer while the needle-carrying bar is being moved to form the stitches placed intermediate the feed actuations, and the cam portion 304 controlling the movements of said piercer during the time that the stitches placed coincidently with the feeding of the material are being formed. At the time that the material is advanced, the upward movements of the piercer are increased to positively insure the point of the piercer clearing the material as the piercer is moved forward preparatory to the formation of the next subsequent series of lock stitches. The piercer and the needles remain in the material and assist the step or feeding foot to advance the material, as will later be described.

305 is a lever provided with a roller 306 which tracks in the cam groove 301, the opposite end of said lever being provided with a hub 307 which is slotted, as at 308, and mounted upon a short shaft 309 journaled in a suitable bearing formed in the overhanging arm.

310 is a lever mounted upon the hub 307 and provided with a slot 311 and a pinch screw 312, which latter, when tightened, acts to grip the lever 310 upon the hub 307 and, in turn, grips the hub 307 upon the shaft 309. The opposite end of the lever 310 is provided with a roller 313 which tracks within a groove 314 formed in the piercer cylinder ring 315. Upon the opposite end of the shaft 309 is suitably secured a lever 316 provided at its outer end with a roller 317 which, like the roller 313, tracks within the groove 314, the lever 316 being provided simply to guard against the ring 315 binding on the cylinder 22 when moved vertically.

318 and 319 are brackets secured by screws 320, 320 and 321, 321, respectively, to the ring 315, said brackets being provided with lugs 322 and 323 which enter openings 324 and 325, respectively, formed in the collar 326. The collar 326 is secured by screws 327 to the piercer bar 328, the upper end of said bar being mounted in a bearing 329 formed in the bracket 26 and near its lower end passes through a bearing 330 formed in an integral part of the swinging frame 21. To the lower end of the piercer bar 328 is secured, by a screw 331, a pinch collar 332 having a downwardly extended portion 333 into which is secured, by a screw 334, the piercer 300, thus completing the train of connections for operatively connecting the piercer with the cam groove 301. It is to be understood that while the use of a piercer is essential to the production of a seam requiring a comparatively large open-work stitch, its use is not essential in effecting two parallel rows of ordinary hemstitching.

350 is a step or feeding foot operated by connections now to be described from the cam groove 351 formed in the outer face of the cam disk 254.

352 is a lever provided at its outer end with a roller 353, its opposite end being constructed with a hub 354 mounted upon a short rock-shaft 355 journaled in a suitable bearing in the overhanging arm, said hub being provided with a slot 356.

357 is a second lever mounted upon the hub 354 and provided with a slot 358 and pinch screw 359, which latter, when tightened, acts to secure said lever upon said hub and said hub upon the rock-shaft 355. The outer end of the lever 357 is provided with a roller 360 which tracks within the groove 361 formed in the feed ring 362, the cam groove 351 being provided with a cam portion 363 which, through the connections described, moves said feed ring vertically in opposite directions once during the formation of each embroidery stitch.

364 and 365 represent the arms of a two-arm operating lever which are joined together at their lower ends and provided with a lug 366. The respective arms are pivoted upon studs 367 and 368 which form a part of the respective brackets 369 and 370 secured in the cylinder 22 by screws 371, 371 and 372, 372, respectively. The arms 364 and 365 are provided at their upper ends with angular portions 373 and 374 which pass through openings 375 and 376, formed in said cylinder, and coact with notches 377 and 378 formed in the upper inner edge of the feed ring 362. The lug 366 extends downward into an opening in the feeder head 379, which latter forms a part of the swinging frame 21, said lug coacting with the inner end of an adjusting screw 380 held against accidental movement by a nut 381.

From the foregoing it will be understood that when the feed ring is moved upward its action upon the angular portions 373 and 374 of the two arm lever causes the lug 366 to swing the frame 21 and parts carried by it. The frame 21 is returned to its normal position by a spring 382 which at one end rests in a seat 383 formed in a bracket 384, the latter being secured to one end of the feeder head 379 by a screw 385, the opposite end of said spring resting in a pocket 386 formed in a short cylinder 387 secured by screws 388 to the lower end of the cylinder 22. To complete the connections between the cam groove 351 and step foot 350, the latter is provided with a rod 389 secured by a pinch screw 390 into a collar-like portion 391 of said step foot, said rod extending up into the hollow portion 392 of the piercer bar 328 in opposition to the resiliency of the spring 393. The step foot 350 is held in proper relationship with the piercer 300 by the inner walls 394 and 395 of said foot slidably contacting with the vertical edge walls 394' and 395' of the portion 333 of the pinch collar 332, which latter is secured to the piercer bar 328 by screw 331. A lever 396 coöperates with the lever 357 to move the feed ring 363, said lever being secured upon the shaft 355 and provided at its outer end with a roller 397 which enters the groove 361 in the ring 362. The step foot 350, like the piercer 300, is moved away from the material once for each complete actuation of the needle-bar, and to effect this, the downwardly extended portion 333 of the pinch collar 332 is provided with a lug 398 which, as the piercer bar 398 is raised, contacts with the lower end of the short rod 389, it being understood that the piercer bar is lifted a distance slightly greater than the distance between the upper side of the lug 398 and the under side of the collar-like portion 391 of the step foot 350.

As represented in Fig. 21, the cam-groove 301 of the disk 259 is formed, intermediate the final piercer-bar lifting portion 304 and the outer position occupied by the roller-stud 306 in said figure, with a depression which is entered by the roller-stud 306 at the completion of a tri-stitch-forming-cycle, whereby the lever-arm 305 receives a final jog for imparting to the piercer-bar an increased lift over that produced by the cam portions 302, 303 and 304. It is this final maximum lift which causes the operative engagement of the lug 398 on the piercer-clamp collar 332 with the lug 391 of the feeding or step-foot 350 by which the latter is raised from the work to enable it to take a fresh hold thereon.

The cylinder 22 is mounted in the forward end of the overhanging arm in suitable bearings consisting of the half bearings 399 and 400 formed in the overhanging arm, and the half bearings formed in the caps 401 and 402, which latter are secured by screws 403 to said arm, the cylinder 22 being held against vertical movement by the gear 120 and short cylinder 387.

425 is a cam groove formed on the rear side of the cam disk 254 and provided with cam portions 426, 427 and 428 which, through the connections now to be described, control the lateral movements of the needle.

429 is a rock lever provided at one end with a hub 430 and carrying at its opposite end a roller 431 which tracks within the cam groove 425, said lever being mounted upon the rock-shaft 264, and said hub being provided with a slot 432. 433 is a second lever having a hub 434 and a slot 435, said hub being mounted upon the hub 430 and, through the pinch screw 436, the hub 434 is secured upon the hub 430 and the latter upon the rock-shaft 264. The lever 433 carries at its outer end a roller 437 which enters the groove 438 formed in the needle controlling ring 439 mounted upon the cylinder 22. The rock-shaft 264 also carries a lever 440 which, in turn, carries at its outer end a roller 441 which, like the roller 437, tracks in the groove 438, thus, in connection with the lever 433, acting to move said ring vertically on the cylinder 22. To the ring 439 is secured, by suitable screws, as 468, 468, a bracket 442 provided with a lug 443 which enters the opening 444 formed in the needle cam shaft 445. The shaft 445 is mounted at its upper end in a bearing 446 carried by the swinging frame 21, its lower end entering a bearing 447 formed in the feeding head 379.

448 and 449 represent the needle vibrating rock-levers which are pivoted upon complemental stud screws 450 threaded into suitable lugs on the feeder head 379, the upper ends of the respective levers being provided with rollers 451 and 452 and carrying at their opposite ends the respective studs 453 and 454. Upon the stud 453 is mounted a rocking guide-block 455, and upon the stud 454 is a like block 456, said blocks being provided with the respective openings 457 and 458 through which pass the respective slide-rods 459 and 460, the lower end of the rod 459 being secured in the needle clamp 38 and the rod 460 in the clamp 39, the respective studs 453 and 454 being provided with suitable openings for the passage of the respective rods 459 and 460.

463 and 464 are inclines formed on the needle-jogging cam-block on the reciprocating rod or shaft 445, said inclines terminating in the respective straight surfaces 465 and 466 and coacting with their respective rollers 451 and 452, through the connections described, to rock said needles outwardly in opposition to the resiliency of the spring 467 which, through its action upon the oppositely arranged blocks 455 and 456, normally holds said needles adjusted to their innermost position, or the position for entering the opening in the material formed by the action of the piercer.

Referring to the cam portions 426, 427 and 428, the portion 426 through the connections 429, 440, 439, 442 and 443, acts to move the needle cam shaft 445 to its lowest position, as when the needles are moved in line to form the stitches c back from the opening in the material, and the cam portion 427 to the position of loop taking, the cam portion 428 causing the inclines on the cam shaft to be moved above the field of action of the rollers 451 and 452, thus permitting the spring 467 to hold the needles in their closest relationship.

In the practical operation of embroidering machines wherein the embroidery or open-work stitch consists of a series of ordinary stitches, it has been demonstrated that the means for controlling the direction of the feed of the material should be secured against manual manipulation except at the time when the material is being advanced intermediate the formation of the individual open-work stitches, and the same is true of the means for arresting the action of the machine, the former means preventing the operator from changing the direction of the feed of the material when stitching a curvilinear or scroll design except at the completion of the overseam stitch, and the latter means preventing the operator from arresting the action of the machine, as is necessary when it is desired to direct the line of stitching at a right or oblique angle to the previously formed stitches, except at the completion of the embroidery stitch.

To guard against the operator interfering with the direction of the feed of the material except at such time as it is being advanced under the needle, I provide the cam disk 254 with a cam section 475, and the cam disk 259 with a complemental cam section 476, said cam sections coacting with rollers 477 and 478 carried by the respective brake levers 479 and 480, which latter are pivoted upon the respective screws 481 and 482 threaded into the bracket 483. The bracket 483 is provided with a short shaft 484 which enters a bearing 485 formed in the arm standard 2, thus permitting said bracket to take its proper angle relatively to the shaft 100 which at its upper end is journaled in said bracket.

487 and 488 represent wedge-shaped brake shoes provided with complemental recesses 489 (one only of which is shown) in which are seated the inner ends of complemental screws 493 (one only of which is shown) which in turn are threaded through the respective levers 479 and 480, said screws being held against accidental adjustment by the respective nuts 495.

497 is a brake pulley secured upon the shaft 100 and provided with a V-shaped groove 498 corresponding in shape to the acting surfaces of the brake shoes 487 and 488.

499 is a spring, one end of which is secured to the lever 479, its opposite end being attached to the lever 480, thus acting to hold said levers in opposition to the action of the cam sections 475 and 476 upon the respective rollers 477 and 478, with the brake shoes forced into the groove 498 of the pulley 497.

From the foregoing it will be understood that when the cam sections 475 and 476 act upon the respective rollers 477 and 478, which occurs during the feeding of the material, the respective levers 479 and 480 are moved in opposite directions, thus releasing the brake shoes from forced contact with the pulley 497.

The foregoing subject matter descriptive of the means for securing the feed-directing mechanism against manual manipulation except when the material is being advanced intermediate the formation of the individual open-work stitches, forms the subject matter of divisional application Serial No. 607,892, filed February 11, 1911, and the subject matter now to be referred to descriptive of the means for arresting the action of the stitch-forming and cloth-feeding mechanisms, forms the subject matter of divisional application Serial No. 607,893, filed February 11, 1911.

To guard against the operator interfering with the operation of the machine except at such time as the material is being advanced under the needle, I provide the cam disk 259 with a cam portion 500 which coacts with a roller 501 once for each rotation of said cam disk, said roller being suitably mounted upon the free end of a connection 502 pivoted to oscillate on the screw 482. The opposite end of the connection 502 is jointed to an L-shaped lever 503 pivoted at 504 to a bracket 506 which, in turn, is secured by screws 507, 507 to the arm standard. The L-shaped lever 503 is pivoted to a plunger 508 mounted in a suitable bearing formed in the arm standard, the free end of said plunger normally extending out slightly beyond the outer rear wall of the arm standard.

509 is a spring, one end of which is attached to the underside of the overhanging arm, the opposite end being secured to the connection 502, thus, through the connections described, holding the free end of the plunger 508 in its normal or outward position except when the roller 501 is acted upon by the cam portion 500, when said plunger is drawn within its bearing.

The application of the stop-motion-controlling mechanism herein pointed out is not limited to any particular form of construction of stop-motion device so long as such controlling mechanism is arranged to coact with some element forming a part of the stop-motion device which, when manually actuated to effect the stopping of the machine, is arrested in its movements until automatically released at substantially the completion of a predetermined number of ordinary stitches constituting the embroidery stitch, as in the production of the present construction. Accordingly, a description of the construction and operation of the stop-motion device forming a part of the present construction is herein given for the purpose of a proper understanding of the action of the controlling mechanism relatively to a stop-motion device.

525 is the brake disk, suitably secured to the crank shaft 4 and provided with openings for the passage of the screws (three) 526, said openings being enlarged for a part of their length to provide pockets for the reception of the springs (three) 527 which are mounted upon the body portions of said screws and confined between the heads of said screws and the bottoms of the spring pockets. The screws 526 pass through the disk 525 and are threaded into the circular plate 528, thus causing the springs 527 to resiliently hold the plate 528 in the direction of the face of the disk 525.

529 is the band wheel or loose pulley which near its outer diameter has secured to it, by a metal ring 589 and screws 590, a ring 530 which, in the present instance, is made of very firm leather, said ring being of sufficient width to extend in between the disk 525 and circular plate 528 thus, through said plate, causing the springs 527 to normally grip said ring and cause the rotary movements of the band wheel to be transmitted to the shaft 4 through the disk 525. To the arm standard there is secured, by screws 531, 531, a bearing plate 532 which has formed integral with it a disk portion 533 and a hub 534. Mounted within and secured to the plate 532 is a bushing 535 into which the shaft 4 is journaled, said bushing extending slightly beyond the disk portion 533 at one side and slightly beyond the end of the hub 534 at the opposite side.

536 is a resistance disk provided with a hub 591 which, in the present instance, is sweated upon the shaft 4. 537 is a movable brake disk into which is secured guide pins (three) 538, which latter pass freely through the disk 533 and extend slightly beyond the face of the plate 532 and outside the periphery of the hub 534. Upon the shaft 4, between the disks 526 and 537, is loosely mounted a brake ring (leather) 539.

540 is a toothed disk mounted upon the hub 534 and provided with teeth 541 having inclines 542, the inner face of said toothed disk resting against the ends of the pins 538. The disk 540 has formed integral with it an arm 543 provided with an opening 544 into which projects a lug 545 carried by a bracket 546 which, in turn, is mounted upon a screw-threaded rod 547. The threaded end of the rod 547 passes freely through a swivel block 548 journaled in a suitable bearing formed in the arm standard and secured in adjusted position by the screw 549. The threaded end of the rod 547 is provided with an adjusting nut 550, and between the blocks 546 and 548 is confined a spring 556 which acts to hold the block 546 pressed against the head 551 of the rod 547.

552 is a second toothed disk mounted upon the hub 534 and provided with teeth 553 and inclines 554. The disk 552 is provided with an arm 555 which is pivotally secured, by a stud 557 and nut 558, in a slot 559 formed in an L-shaped lever 560, which latter is provided at one end with a brake shoe 561. The opposite end of the lever 560 is provided with a suitable roller which enters the cam slot 563 formed in the cam lever 564, the latter being provided with an arm 565 later to be referred to. In the face of the disk 525 is secured a brake ring 566 which, in the present instance, is formed of leather and located outside the heads of the screws 526, the outer face of said brake ring lying slightly within the plane of the face of the heads of said screws. In the toothed disk 552 is loosely seated a metal ring 567 which is of sufficient diameter to include the heads of the screws 526.

568 is a short rock-shaft, upon one end of which is secured the cam lever 564 and upon the opposite end an arm 569, to the outer end of which latter is pivotally attached a connection 570, said connection being pivotally attached to an arm 571 which, in turn, is secured upon a rock-shaft 572 journaled in bearings formed in the lugs 105 and 573, the latter extending downward from the sewing machine bed-plate.

574 represents a second arm secured upon the shaft 572 and provided at its outer end with a roller 575, which roller enters an annular groove 576 formed in a sliding collar 577 mounted upon the shaft 100. The shaft 100 is provided at its lower end with a tubular portion in which slides a rod 578, said rod being connected at one end, by a screw 580, with the collar 577. The screw 580 passes through the collar 577, then through an elongated slot 579 formed in the shaft 100 and is threaded into the rod 578. The lower end of said rod is connected to one end of a rock lever 581 pivoted, by a screw 582, to a lug depending from the crank 106. The opposite end of the rock lever 581 is provided with a stud 583 which enters an annular groove 584 formed in the metal bushing 585 carrying the handle 107, said bushing being capable of both sliding and rotary movements on the rod 108.

586 is a spring, one end of which is secured in the hub 587 formed on the arm standard, the opposite end resting against the underside of the cam lever 564 and normally acting to raise said lever and cause the arm 565 to contact with the plunger 508. If not otherwise controlled, the spring 586 would advance the parts to speed arresting position, when the plunger 508 would be automatically withdrawn from contact with the arm 565 through the automatic action of the connections previously described.

To prevent the spring 586 from moving the lever 564 except at will, the operator holds the handle 107, in opposition to the force of said spring, in its lowest position, as shown in Fig. 16; but when it is desired to stop the machine, the operator moves the handle 107 vertically on the rod 108, thereby permitting and assisting the spring 586 to move the arm 565 in contact with the plunger 508, and as soon as said plunger is withdrawn the parts are advanced to speed arresting position.

When the operator permits the spring 586 to move the handle 107 to the limit of its upward stroke, the brake shoe 561 contacts with the cam portion 588 formed on the brake disk 525, and the roller 562 is positioned at the lower end of the slot 563. The action of the brake shoe 561 upon the cam portion 588 causes the toothed disk 552 to be slightly rotated, such rotation causing the inclines 554 to ride the inclines 542. The action of the inclines 554 on the inclines 542 forces the ring 567 in contact with the heads of the screws 526 and causes the disk 525 to be moved out of gripping engagement with the ring 530, thus releasing the loose pulley 529 from engagement with the brake disk 525 and forcing the side of the toothed disk 552 into frictional contact with the leather brake ring 566.

At the time that the ring 567 is acting upon the heads of the screws 526, the side of the toothed disk 540 is acting against the ends of the guide pins 538, thus forcing the movable disk 537 in the direction of the length of the shaft 4 and against the brake ring 539, and the latter against the resistance disk 536, thus effecting frictional engagement between the resistance disk 536 and the disk 537, which latter is held against rotary movements by the pins 538 passing through the disk portion 533. The action of the toothed disk 552 upon the ring 566, and the action of the toothed disk 540 on the resistance disk 536 causes the speed of the machine to be gradually slackened; and the coaction of the brake 561 and cam portion 588 brings the machine to rest and controls the position in which the parts comprising the actuating mechanism of the sewing machine will be brought to rest. The starting of the machine is accomplished by moving the handle 107 to its lowest position.

From the foregoing it will be understood that the stopping and starting of the machine is manually controlled, and that such control is automatically timed so as to insure the complete formation of the individual embroidery stitches before the machine is brought to rest, or when it is desired to change the line of the feed in a direction at right angles or obliquely to the previously formed stitches, as is often necessary in the practical operation of the machine.

600 is the cloth presser lifting lever pivoted upon the screw 601, which latter is threaded into the end of the rock-shaft 264, the forward end of said lever being provided with a step 602 which, when the lever is rocked by a downward movement of the rod 603, contacts with the underside of the forked end of the lever 265, thus effecting the raising of the cloth-presser 281 away from the material. In the present construction the cloth-presser is manually raised through the commonly-employed presser-lifting knee lever, and the rock lever 604 and rod 605 form a part of the connections for operatively connecting such knee lever with the rod 603.

As the mechanism for manually lifting the cloth-presser forms no part of my invention, it has been deemed unnecessary to further illustrate or describe it.

In universal feed sewing machines with rotary stitch-forming mechanism, as heretofore constructed, it has been proposed to mount by a universal-joint connection a laterally movable needle-bar upon a reciprocating supporting member arranged in guides parallel with but eccentric to the axis of rotation of the stitch-forming mechanism. This produced not only a tendency of the supporting member to cramp within its guideways, but made it necessary to apply special means for guiding the needle-bar to prevent its displacement in other directions than that in which jogging or overseaming movements was required. According to the present improvement, the needle-bar is journaled for reciprocation in a swinging frame which is fulcrumed upon transverse fulcrum-pins supported within and embraced by the rotary housing cylinder or carrier and upon an axis intersecting that of the needle-bar. The needle-frame is by said fulcrum-pins thus prevented from performing its lateral movements in any but a single plane relative to its supporting fulcrum-pins, while the needle-bar is assured an adequate bearing to obviate lost-motion detrimental to the appearance of the hemstitch seam.

While the present improvement includes certain features which are adapted to machines of other descriptions, it will be observed that the mechanism herein shown and described is embodied in a "needle-feed" machine in which the needle, piercer and feeding foot partake of the same work-advancing movements in a direction to which the needle-jogging movements are transverse.

Before the needles 40 and 41 reach the material in their descent to form the duplicate lock stitches $a$ and $b$, they are moved through the action of the spring 467 close into the oppositely arranged grooves 337 (one only of which is shown) of the piercer 300, the inclines 463 and 464 being at such time positioned above or out of operative relationship with the rollers 451 and 452. After the needles have entered the material they are given lateral movements away from the piercer to present the loops of needle thread to the action of the respective loop-takers 63 and 64, through the downward movements of the inclines 463 and 464 acting upon their respective rollers 451 and 452. The needles remain in their extended position until moved nearly to the limit of their upward stroke, when they are further extended and caused to descend in line with the depth stitches $c$ and $d$ through the continued downward movements of the inclines 463 and 464. As the needles in their descent again enter the material they are caused to move inwardly toward the piercer or to loop-taking position, through the upward movements of the inclines 463 and 464. The needles remain in this position until they are moved for the second time to their highest position, when they are again moved by the spring 467 close into the piercer grooves, the inclines 463 and 464 having in the meantime been moved to their highest position; and as the needles again descend to pierce the material in the formation of the second duplicate lock stitches $a$ and $b$ they are returned, through the downward movements of said inclines, to loop-taking position where they remain until again moved to their highest position or the position for commencing the next subsequent series of lock stitches comprising the open-work stitch.

What I claim is:—

1. In an embroidering machine, a bracket-arm, a main-shaft, a rotary carrier mounted in said arm, means for turning said carrier, a needle-frame pivotally mounted in said carrier, a connection between the main-shaft and said frame for imparting swinging movements to the latter, a vertically movable needle-bar mounted in and concentric with the axis of said frame and provided with an oscillating needle-carrier, and a connection between the main-shaft and the needle-bar for reciprocating the latter.

2. In an embroidering machine, a bracket-arm, a main-shaft, a rotary carrier mounted in said arm, means for turning said carrier, a needle-frame pivotally mounted in said carrier and provided with a feeding foot, a connection between the main-shaft and said frame for imparting swinging movements to the latter, a needle-bar mounted to reciprocate in said frame and provided with a needle-carrier, and connections between the main-shaft and the needle-bar for reciprocating the latter, in combination with a needle-thread take-up mounted independently of said carrier, and means for actuating it.

3. In an embroidering machine, a bracket-arm, a main-shaft, a rotary carrier mounted in said arm, manually actuated means for turning said carrier, a needle-frame pivotally mounted in said carrier, connections between the main-shaft and said frame for imparting swinging movements to the latter, a needle-bar mounted to reciprocate in said frame and provided with a needle-carrier, and connections between the main-shaft and the needle-bar for reciprocating the latter, in combination with automatically controlled means including a brake-disk and coacting brake-shoe, for determining the time of manual rotation of said carrier.

4. In an embroidering machine, a bed-plate, an overhanging bracket-arm, a main-shaft provided with oppositely arranged cranks, a needle-bar, an operative connection between said needle-bar and one of said cranks, a needle carried by said needle-bar, a complemental loop-taker arranged below the bed-plate, an operative connection between said loop-taker and the other of said cranks, a rotary carrier mounted in the bracket-arm, a needle-frame pivotally mounted in said carrier and provided with a feeding foot and a reciprocating piercer-carrying bar, connections between the main-shaft and the needle-frame for imparting swinging movements to the latter, and means for turning said carrier.

5. In an embroidering machine, a main-shaft, a needle-bar, an operative connection between the main-shaft and the needle-bar, a needle carried by the needle-bar, a loop-taker arranged below the bed-plate, an operative connection between said main-shaft and the loop-taker, feeding mechanism for advancing the work after the completion of each group or succession of stitches of predetermined number, and manually actuated means for controlling the direction of the feeding movements, in combination with a stop-motion mechanism manually controlled to arrest the movements of the stitch-forming and feeding mechanisms, and automatically acting means normally operating to prevent the operation of the stop-motion mechanism but ceasing its preventing action at the completion of each of said groups or successions of stitches.

6. In an embroidering machine, a bed-plate, an overhanging bracket-arm, a main-shaft, a rotary carrier mounted in said arm, hand-operated means for turning said carrier, a needle-frame pivotally mounted in said carrier, a needle-bar and a piercer-bar mounted in said frame, means for reciprocating said needle-bar and piercer-bar, a needle carried by said needle-bar, a piercer carried by the piercer-bar, a loop-taker arranged below the bed-plate, a rotary carrier upon which the same is mounted, actuating means for said loop-taker, a connection between said rotary carriers, and hand-operated means for rotating said carriers in unison.

7. In an embroidering machine, a bracket-arm, a main-shaft, a rotary carrier mounted in said arm, means for turning said carrier, a needle-frame pivotally mounted in said carrier, a connection between the main-shaft and said frame for imparting swinging movements to the latter, a needle-bar mounted to reciprocate in said frame and provided with a needle-carrier, a connection between the main-shaft and the needle-bar for reciprocating the latter, in combination with a stop-motion mechanism, manually controlled means for operating the same to stop the machine, and automatically acting means normally operating to prevent the operation of the stop-motion mechanism but ceasing its preventing action at the completion of each group or succession of stitches.

8. In a sewing machine, a circularly and laterally movable needle-frame, a vertically movable needle-bar mounted in and concentric with the axis of said frame, an oscillating needle-clamp carried by said needle-bar and a coöperating loop-taker, a feeding member connected and circularly movable with said needle-frame, and means for imparting operative movements to the several moving parts.

9. In a sewing machine, the combination with a carrier adapted to rotate, of a needle-frame pivotally supported thereby, a reciprocating needle-bar journaled in said needle-frame, a needle mounted in said needle-bar and a coöperating loop-taker, a feeding member connected to rotate with said carrier, and means for imparting operative movements to the several moving parts.

10. In a sewing machine, the combination with a carrier adapted to rotate, of a laterally movable needle-frame supported thereby, a needle-bar journaled in and adapted to reciprocate in said needle-frame, a needle mounted in said needle-bar and a coöperating loop-taker, a feeding member carried by and movable with said needle-frame, and means for imparting operative movements to the several moving parts.

11. In a sewing machine, the combination with a carrier adapted to rotate, of a laterally movable needle-frame pivotally supported thereby, a needle-bar journaled in and adapted to reciprocate in said needle-frame, a needle carried by said needle-bar and laterally movable transversely of the direction of lateral movement of the needle-frame, a loop-taker coöperating with said needle, a feeding member adapted to rotate with said carrier, and means for imparting operative movements to the several moving parts.

12. In a sewing machine, a circularly and laterally movable needle-frame, a reciprocating needle-bar journaled therein, needle-carriers mounted upon said needle-bar and laterally movable thereon transversely of the direction of lateral movement of said needle-frame, needles mounted in said needle-carriers and loop-takers coöperating with said needles, a feeding member circularly movable with said needle-frame, and means for imparting operative movements to the several moving parts.

13. In a sewing machine, a circularly and laterally movable needle-frame, a reciprocating needle-bar journaled therein, needle-carriers pivotally mounted upon said needle-bar and laterally movable thereon transversely of the direction of lateral movement of said needle-frame, needles mounted in said needle-carriers and loop-takers coöperating with said needles, a feeding member circularly movable with said needle-frame, and means for imparting operative movements to the several moving parts.

14. In a sewing machine, a circularly and laterally movable needle-frame, a feeding member carried thereby, a reciprocating needle-bar journaled in said needle-frame, needle-carriers mounted upon and movable transversely of the direction of lateral movement of said needle-frame, needles mounted in said carriers and coöperating loop-takers, and means for imparting operative movements to the several moving parts.

15. In a sewing machine, a carrier adapted to rotate, a needle-frame pivotally supported thereby, a reciprocating needle-bar journaled in said needle-frame, a needle-carrier mounted upon said needle-bar and adapted for lateral movement transversely of that of the needle-frame, a needle mounted in said needle-carrier and a coöperating loop-taker, a vibrating take-up lever having a fixed fulcrum, and means for imparting operative movements to the several moving parts.

16. In a sewing machine, the combination with a rotary carrier, of a transverse fulcrum fixed within the same, a swinging needle-frame journaled upon said fulcrum and depending therefrom, means mounted upon said carrier for imparting swinging movements to the needle-frame, a reciprocating needle-bar journaled in the needle-frame, and means for actuating said needle-bar.

17. In a sewing machine, the combination with a rotary carrier, of a transverse fulcrum fixed within the same, a swinging needle-frame journaled upon said fulcrum and depending therefrom, a reciprocating needle-bar journaled in the needle-frame, means for swinging said needle-frame, and means independent thereof for reciprocating the needle-bar.

18. In a sewing machine, the combination with a rotary carrier, of a transverse fulcrum fixed within the same, a swinging needle-frame journaled upon said fulcrum and depending therefrom, a reciprocating needle-bar journaled in the needle-frame, in substantially intersecting relation with the axis of said fulcrum, means for swinging said needle-frame, an actuating rock-lever, and a laterally sliding pivotal connection between said rock-lever and the needle-bar.

19. In a sewing machine, the combination with a rotary carrier, of a fulcrum fixed within the same, a swinging needle-frame journaled upon said fulcrum and depending therefrom, a vibratory operating lever fulcrumed upon and housed within said carrier and operatively connected with the needle-frame, actuating means for said operating lever, a reciprocating needle-bar journaled in the needle-frame, and means for actuating said needle-bar.

20. In a sewing machine, the combination with a rotary carrier, of a fulcrum fixed within the same, a swinging needle-frame journaled upon said fulcrum and depending therefrom, a vibratory operating lever fulcrumed upon and housed within said carrier, an adjustable connection between said operating lever and the needle-frame, actuating means for said operating lever, a reciprocating needle-bar journaled in the needle-frame, and means for actuating said needle-bar.

21. In a sewing machine, the combination with a rotary carrier, of a fulcrum fixed within the same, a swinging needle-frame journaled upon said fulcrum and depending therefrom and provided below said fulcrum with a lateral extension having a shoulder exterior to the carrier, a vibratory operating lever fulcrumed upon and housed within said carrier and formed with a lug disposed in operative relation with said shoulder of the needle-frame, an adjusting screw mounted in said extension of the needle-frame and adapted for engagement with the lug of said operating lever, actuating means for said operating lever, a reciprocating needle-bar journaled in the needle-frame, and means for actuating said needle-bar.

22. In a sewing machine, the combination with a rotary carrier, of a fulcrum fixed within the same, a swinging needle-frame journaled upon said fulcrum and depending therefrom, a vibratory operating lever constructed with two spaced parallel arms embracing the needle-frame and fulcrumed upon said carrier, an operative connection between said operating lever and the needle-frame, actuating means for said operating lever, a reciprocating needle-bar journaled in the needle-frame, and means for actuating said needle-bar.

23. In a sewing machine, the combination with a rotary carrier, of a fulcrum fixed within the same, a swinging needle-frame journaled upon said fulcrum and depending therefrom, a vibratory operating lever fulcrumed upon and housed within said carrier and having one arm operatively connected with the needle-frame and another arm formed with a cammed outer portion extending through the wall of said carrier, a reciprocating actuator arranged exterior to said carrier and adapted to operatively engage the cammed portion of said operating lever-arm, means for reciprocating said actuator, a reciprocating needle-bar journaled in the needle-frame, and means for actuating said needle-bar.

24. In a sewing machine, the combination with a rotary carrier, of a transverse fulcrum fixed within the same, a swinging needle-frame journaled upon said fulcrum and depending therefrom, means for imparting swinging movements to the needle-frame, a reciprocating needle-bar journaled in the needle-frame, a needle-clamp carrying a needle, a fulcrum for said needle-clamp mounted upon the needle-bar transverse to that of the needle-frame, means for imparting vibratory movements to the needle-clamp, and means for reciprocating the needle-bar.

25. In a sewing machine, the combination with a rotary carrier, of a transverse fulcrum fixed within the same, a swinging needle-frame journaled upon said fulcrum and depending therefrom, means for imparting swinging movements to the needle-frame, a reciprocating needle-bar journaled in the needle-frame, a needle-clamp mounted for lateral movement upon the needle-bar and carrying a needle, a rock-lever pivotally mounted upon the needle-frame, an operative connection between said rock-lever and the needle-clamp, actuating means for said rock-lever, and means for reciprocating the needle-bar.

26. In a sewing machine, the combination with a rotary carrier, of a transverse fulcrum fixed within the same, a swinging needle-frame journaled upon said fulcrum and depending therefrom, means for imparting swinging movements to the needle-frame, a reciprocating needle-bar journaled in the needle-frame, a needle-clamp mounted for lateral movement upon the needle-bar and carrying a needle, a rock-lever pivotally mounted upon the needle-frame, a reciprocating cam-block mounted upon the needle-frame in operative relation with said rock-lever, means for reciprocating said cam-block to actuate the rock-lever, and means for reciprocating the needle-bar.

27. In a sewing machine, the combination with a rotary carrier, of a transverse fulcrum fixed within the same, a swinging needle-frame journaled upon said fulcrum and depending therefrom, means for imparting swinging movements to the needle-frame, a reciprocating needle-bar journaled in the needle-frame, a needle-clamp mounted for lateral movement upon the needle-bar and carrying a needle, a slide-rod rigidly connected with the needle-clamp, a plural-armed rock-lever pivotally mounted upon the needle-frame, a guide-block swiveled to an arm of said rock-lever and entered by the slide-rod, actuating means carried by the needle-frame and engaging another arm of said rock-lever for imparting operative movements thereto, and means for reciprocating the needle-bar.

28. In a sewing machine, the combination with a rotary carrier, of a transverse fulcrum fixed within the same, a swinging needle-frame journaled upon said fulcrum and depending therefrom, means for imparting swinging movements to the needle-frame, a reciprocating needle-bar journaled in the needle-frame, two rocking needle-clamps mounted upon and at opposite sides of the needle-bar, a slide-rod fixed in each of said needle-clamps in normal parallel relation, two plural-armed rock-levers fulcrumed independently upon said needle-frame, a guide-block swiveled to an arm of each of said rock-levers and entered by the slide-rod of its respective needle-clamp, a spring interposed between said guide-blocks, a cam-block mounted for reciprocation upon the needle-frame intermediate said rock-levers and adapted to engage arms of the same to impart vibratory movements thereto, and means for reciprocating the needle-bar.

29. In a sewing machine, the combination with a rotary carrier, of a transverse fulcrum fixed within the same, a swinging needle-frame journaled upon said fulcrum and depending therefrom, means for imparting swinging movements to the needle-frame, a reciprocating needle-bar journaled in the needle-frame, a needle-clamp mounted for lateral movement upon the needle-bar and carrying a needle, a rock-lever pivotally mounted upon the needle-frame, an operative connection between said rock-lever and the needle-clamp, a reciprocating cam-block mounted upon the needle-frame in operative relation with said rock-lever, a slide-ring fitted upon the exterior of the carrier and having an operative connection through the latter with said cam-block, means for imparting operative movements to said slide-ring, and means for reciprocating the needle-bar.

30. In a sewing machine, the combination with a rotary carrier, a laterally movable needle-frame supported by and housed within said carrier, a reciprocating needle-bar journaled in the needle-frame, a reciprocating piercer-bar journaled in the needle-frame, a needle carried by the needle-bar, a piercer carried by the piercer-bar, means for turning said carrier, means for reciprocating the needle-bar, and means independent thereof for reciprocating the piercer-bar.

31. In a sewing machine, the combination with a rotary carrier, a laterally movable needle-frame supported by and housed within said carrier, a reciprocating needle-bar journaled in the needle-frame, a reciprocating piercer-bar journaled in the needle-frame, a piercer carried by the piercer-bar, a needle carried by the needle-bar and laterally movable toward and from the piercer in a direction transverse to the lateral movements of the needle-frame, means for imparting lateral movements to the needle, and means for reciprocating the needle-bar.

32. In a sewing machine, the combination with a rotary carrier, a laterally movable needle-frame supported by and housed within said carrier, a reciprocating needle-bar journaled in the needle-frame, a reciprocating piercer-bar journaled in the needle-frame, a needle carried by the needle-bar, a piercer carried by the piercer-bar, means for turning said carrier, means for reciprocating the needle-bar, a sliding actuating member mounted upon and exterior to said carrier, means for reciprocating the same, and an operative connection extending through the wall of the carrier between said actuating member and the piercer-bar.

33. In a sewing machine, the combination with a rotary carrier, a laterally movable needle-frame supported by and housed within said carrier, a reciprocating needle-bar journaled in the needle-frame, a reciprocating piercer-bar journaled in the needle-frame, a needle carried by the needle-bar, a piercer carried by the piercer-bar, means for turning said carrier, means for reciprocating the needle-bar, a sliding actuating member mounted upon and exterior to said carrier, means for reciprocating the same, and a pivotal connection extending through the wall of the carrier between said actuating member and the piercer-bar.

34. In a sewing machine, the combination with a rotary carrier, a laterally movable needle-frame supported by and housed within said carrier, a reciprocating needle-bar journaled in the needle-frame and carrying a laterally moving needle, a reciprocating piercer-bar journaled in the needle-frame and carrying a piercer, means for reciprocating the needle-bar and piercer-bar, a spring-pressed feeding foot carried by and partaking of the lateral movements of the needle-frame, and means for lifting said foot periodically at the end of each succession of needle-bar reciprocations of predetermined number.

35. In a sewing machine, the combination with a rotary carrier, a laterally movable needle-frame supported by and housed within said carrier, a reciprocating needle-bar journaled in the needle-frame and carrying a laterally moving needle, a reciprocating piercer-bar journaled in the needle-frame and carrying a piercer, means for reciprocating the needle-bar and piercer-bar, a spring-pressed feeding foot carried by and partaking of the lateral movements of the needle-frame, and an operative connection between the piercer-bar and the feeding foot whereby the latter is periodically lifted.

36. In a sewing machine, the combination with a rotary carrier, a laterally movable needle-frame supported by and housed within said carrier, a reciprocating needle-bar journaled in the needle-frame and carrying a laterally moving needle, a reciprocating piercer-bar journaled in the needle-frame and carrying a piercer, means for reciprocating the needle-bar and piercer-bar, a spring-pressed feeding foot carried by and partaking of the lateral movements of the needle-frame, and a lug carried by the piercer-bar and extending beneath a portion of said feeding foot for operative engagement therewith to lift the foot as the piercer-bar reaches its highest position.

37. In a sewing machine, the combination with a rotary carrier, a laterally movable needle-frame supported by and housed within said carrier, a reciprocating needle-bar journaled in the needle-frame and carrying a laterally moving needle, a reciprocating piercer-bar journaled in the needle-frame and carrying a piercer, means for imparting to the piercer-bar reciprocatory movements of different extent in the production of each group or succession of stitches of predetermined number, a spring-pressed feeding foot carried by and partaking of the lateral movements of the needle-frame, and an operative connection between the piercer-bar and the feeding foot whereby the latter is raised only on a maximum stroke of the piercer-bar.

38. In a sewing machine, the combination with a rotary carrier, a laterally movable needle-frame supported by and housed within said carrier, a reciprocating needle-bar journaled in the needle-frame and carrying a laterally moving needle, a reciprocating piercer-bar journaled in the needle-frame and carrying a piercer, means including a pluralstepped cam for imparting to the piercer-bar, during the production of a group or succession of stitches of predetermined number, a corresponding number of reciprocations of uniform extent of which the final one is followed by a second stage movement to lift said bar to a maximum height, a spring-pressed feeding foot carried by and partaking of the lateral movements of the needle-frame, and an operative connection between the piercer-bar and the feeding foot whereby the latter is raised only during the final stage movement of the piercer-bar.

39. In a sewing machine, the combination with stitch-forming mechanism comprising an oscillating loop-taker operatively connected with the actuating mechanism of the sewing machine through a spirally threaded loop-taker driving shaft, a reciprocating and laterally moving needle and adapted for rotation, means for rotating said stitch-forming mechanism, means for imparting reciprocating movements to said needle, a take-up member mounted upon a fixed fulcrum, a cam member, a connection intermediate said cam member and the needle for imparting lateral movements thereto and operative connections intermediate said cam member and the take-up member.

40. In a sewing machine, the combination with stitch-forming mechanism comprising a reciprocating and laterally moving needle and adapted for rotation, of a vibrating take-up lever mounted upon a fixed fulcrum substantially parallel with the axis of rotation of said stitch-forming mechanism with its operative end movable in a path toward and from said axis of rotation, a thread-guide concentric with the axis of rotation of said stitch-forming mechanism and adjacent the path of movement of the take-up lever, independent means for imparting reciprocating and lateral movements to said needle, and means independent of the needle-reciprocating means for operating the take-up lever.

41. In a sewing machine, the combination with a needle-frame, of stitch-forming mechanism comprising a needle-bar journaled in said needle-frame and carrying a laterally moving needle, a loop-taker coöperating with said needle, a feeding member carried by said needle-frame, a take-up member, means for imparting reciprocating movements to said needle-bar and operative movements to said loop-taker, synchronously moving cams, and operative connections between one of the latter and the needle for imparting lateral movements thereto, and between others of said cams and the feed and take-up members for imparting operative movements thereto.

42. In a sewing machine, the combination with the main-shaft provided with oppositely arranged cranks, of stitch-forming mechanism comprising a reciprocating needle-bar, a laterally moving needle carried thereby, and a coöperating loop-taker carried by a spirally threaded shaft, operative connections comprising pitmen and rock-levers between said needle-bar and one of the cranks upon the main-shaft and between the other crank of said main-shaft and the spirally threaded shaft, and means independent of said cranks for imparting lateral movements to said needle.

43. In a sewing machine, the combination with the main-shaft provided with oppositely arranged cranks, of stitch-forming mechanism comprising a reciprocating needle-bar, a laterally moving needle carried thereby and a coöperating loop-taker, operative connections between said needle-bar and one of the cranks upon the main-shaft and between the other crank of said main-shaft and the loop-taker, a reciprocating piercer toward and from which the lateral movements of the needle are effected, feeding mechanism, a rotary cam member having a plurality of operative cam portions, and operative connections from said cam member to the needle for imparting vibrating movements thereto, to the piercer for imparting reciprocating movements thereto independently of the corresponding movements of the needle, and to the feeding mechanism for imparting operative movements thereto.

Signed at Bridgeport, in the county of Fairfield, and State of Connecticut, this 9th day of November, A. D. 1907.

DONALD NOBLE.

Witnesses:
 ABBIE M. DONIHEE,
 A. K. WILLIAMS, Jr.